United States Patent [19]
Abbate et al.

[11] 3,929,250
[45] Dec. 30, 1975

[54] GASOLINE TANK PLUG

[75] Inventors: John Abbate; Warren R. Jewett, both of Orange; William H. Mason, Woodbridge, all of Conn.

[73] Assignee: John Abbate, Orange, Conn.

[22] Filed: Feb. 3, 1975

[21] Appl. No.: 546,328

[52] U.S. Cl. .................................. 220/237; 138/90
[51] Int. Cl.² ......................................... B65D 53/00
[58] Field of Search .......... 220/235, 233, 234, 236, 220/237; 138/90

[56] References Cited
UNITED STATES PATENTS

| | | | |
|---|---|---|---|
| 686,387 | 11/1901 | Cogswell | 220/237 |
| 2,324,545 | 7/1943 | Svirsky | 220/237 X |
| 3,419,180 | 12/1968 | Homrig et al. | 220/235 |

*Primary Examiner*—William I. Price
*Assistant Examiner*—Steven M. Pollard
*Attorney, Agent, or Firm*—Patrick C. Baker

[57] ABSTRACT

A device for plugging gasoline tank holes and the like, comprising a bolt, a radially expandable sleeve seal on the bolt, a gasket over the sleeve seal, the outside diameter of the gasket being greater than the diameter of the hole to be repaired, a washer on the bolt having a cavity for sealingly receiving the gasket, and one or more nuts on an intermediate threaded portion of the bolt. One end of the bolt is flared and the other end has a grippable surface. When the device is inserted in a hole with the gasket and washer abutting the perimeter of the hole outside the tank, the action of the nut on the washer causes the flared end of the bolt to expand the sleeve seal to a diameter greater than that of the hole. The sleeve seal is thereby engaged and anchored on the edges of the hole interiorly of the tank while the gasket seals the hole.

6 Claims, 7 Drawing Figures

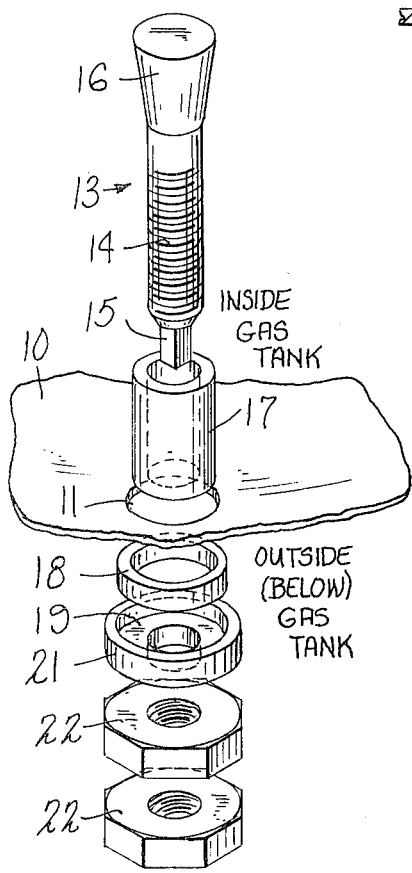
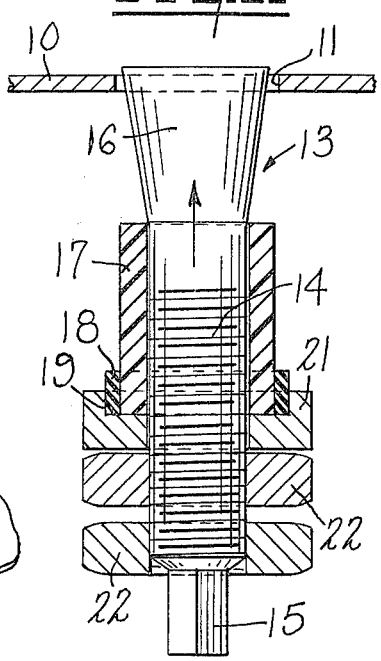
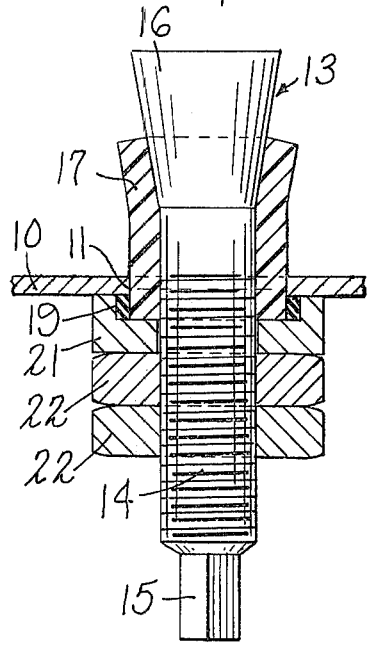
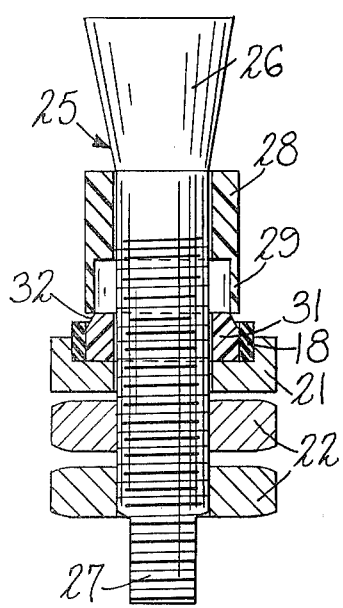
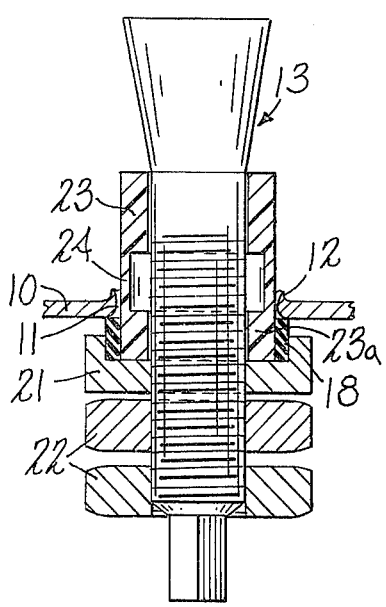
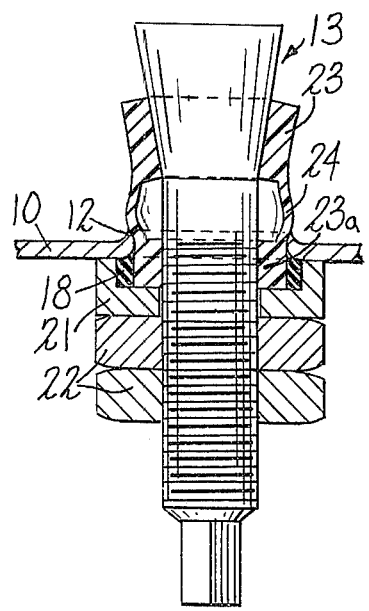
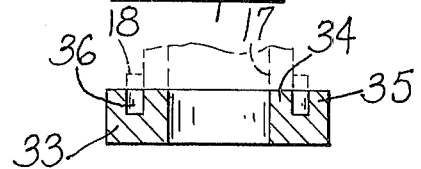

GASOLINE TANK PLUG

BACKGROUND OF THE INVENTION

This invention relates to devices for plugging holes in gasoline tanks and the like.

Aside from the problem of plugging pin holes in vehicular and other types of gasoline tanks, it is often desirable that the garage mechanic be able to punch or drill a hole in a tank for the purpose of removing accumulated water and dirt or merely to remove residual gasoline so that a tank gooseneck or other part may be repaired. This is required even if the cause of the accumulations is located and corrected, such as a malfunctioning firing chamber, carburetor or fuel pump. In the absence of a convenient device for plugging a hole in a gasoline tank, the entire tank must be removed and discarded. A simple, inexpensive and conveniently insertable plug device is therefore needed to avoid such expense.

OBJECTS AND SUMMARY

Accordingly, an object of the invention is to provide a new and improved device for convenient and inexpensive plugging of a hole in a gasoline tank, which device is easily inserted in such hole by a garage mechanic.

Still another object is to provide a new and improved device for plugging a hole in a gasoline tank after removal of residual gasoline, accumulated water and other matter, which device in certain embodiments may repeatedly be removed and reinserted when draining of the tank is again required.

These and other objects, features and advantages of the invention will be apparent from the specification which follows.

In summary outline, the invention comprises the combination of a bolt having a flared end, a grippable end and a threaded portion between the ends; a nonmetallic, radially expandable sleeve seal slidably fitted on the bolt below the flared end and having an outside diameter such that the sleeve seal is receivable in a hole of predetermined diameter in a gasoline tank; a gasket slidably fitted on the sleeve seal, the outside diameter of the gasket being greater than the diameter of the hole; a washer on the bolt, the washer having a cavity for sealingly receiving the gasket; and at least one nut on the threaded portion of the bolt in abutment with the washer on the opposite face thereof from the cavity.

The combination of bolt and sleeve seal is first inserted through the hole in the gasoline tank with the flared end of the bolt inwardly of the tank. The gasket and washer are then fitted over the bolt in abutment with the edge of the hole outside the gas tank. The nut is threaded on the bolt and as it is tightened, the flared end of the bolt spreads the sleeve seal outwardly of the hole, thereby causing the sleeve seal to engage and to be anchored on the edges of the hole inside the tank, and to seal against the edges of the hole. The gasket thereby forms a tight seal around the rim and edges of the hole outside of the tank.

The sleeve seal may take several forms. In one form it is unitary in construction but has a portion of reduced thickness intermediate its ends, positioned such that upon advancement of the nut on the bolt, the reduced thickness wall portion bulges outwardly, thereby enhancing the engagement and anchoring of the sleeve seal on the inside edges of the hole. This aspect of the invention provides significant benefit when the hole has been cut or punched so as to leave a burr or irregular edge inwardly of the tank. The bulge fills in such irregularities and forms a more secure engagement with the inside edge of the hole.

The invention accordingly comprises a device possessing the features, properties and relation of elements which will be exemplified in the device hereinafter described, and the scope of the invention will be indicated in the claims.

DETAILED DESCRIPTION

For a fuller understanding of the nature and objects of the invention, reference is made to the following description taken in conjunction with the accompanying drawing, in which:

FIG. 1 is an exploded view of a device of the invention in association with a gasoline tank;

FIG. 2 is a detailed sectional view of one embodiment of device as it is being inserted through a hole in a gasoline tank;

FIG. 3 is a detailed sectional view of the same embodiment as FIG. 2 showing the device in sealing engagement;

FIG. 4 is a detailed sectional view of another embodiment of device of the invention prior to sealing engagement;

FIG. 5 is a sectional view of the embodiment of FIG 4 showing the device in sealing engagement;

FIG. 6 is a detailed sectional view of still another embodiment of device of the invention; and FIG. 7 is a sectional view of another form of metal washer utilizable with the other components of devices of the invention.

With respect to FIGS. 1–3, a gasoline tank 10 is shown having a hole 11 to be plugged. If the hole 11 is punched it will usually have an irregular edge or burr 12 directed inwardly of the tank wall, as ilustrated in FIGS. 4 and 5. A device of the invention includes a bolt 13 having an intermediate threaded portion 14, a lower end 15 which can be gripped by a tool such as a wrench or pliers, and an opposite end 16 characterized by a flare, that is, a portion which slopes or curves outwardly of the wall of the intermediate portion 14. The maximum diameter of the flared portion 16 is less than the diameter of the hole 11 so that the bolt can be inserted through the hole.

The grippable lower end 15 can be square cut, hexagonally cut or double flat cut, or have any other configuration useful for providing a grip thereon, either by hand or by a tool such as a wrench or pliers.

Slidably fitted on the bolt is a radially expandable sleeve seal 17. The sleeve seal 17 has an outside diameter enabling it to be received through hole 11 but is sufficiently snug both on the bolt and against the edges of the hole so that some sealing effect can be achieved by a slight radial expansion of the sleeve seal. The sleeve seal 17 should be slightly resilient, so that it offers some possibility of being removed and reinserted, but not so resilient or elastomeric that the flared portion 16 of the bolt can be drawn entirely through the sleeve seal while it is in the hole 11.

The sleeve seal generally should be non-metallic and have sufficient strength to retain its essential dimensions when forced downwardly in the hole by contact with the flared portion 16, in a manner to be explained. In addition, the sleeve seal 17 must be substantially impervious and inert to water and gasoline.

A variety of plastic materials are commercially available for such uses, such as the "Delrin" acetal resins and the nylons. The necessary strength, rigidity and degree of resiliency can also be achieved in other somewhat more elastomeric materials by incorporation of various modifiers, such as glass fibers or other minerals. Such composite materials are also well known.

The device includes a gasket 18 as the primary sealing material of the device. The gasket 18 is formed of a gasoline and water impervious material, such as acetal resin or nylon, or it may be a somewhat more elastomeric material such as a synthetic rubber, including buna-N rubber. Somewhat hardened rubber is preferred.

The gasket 18 fits slidably on the sleeve seal 17 below the gas tank 10 and for this purpose has an outside diameter somewhat greater than the diameter of the hole 11. The gasket 18 seats in the cavity 19 of a washer 21. This requires, of course, that the washer 21 have a diameter larger than that of the hole 11. Although the inside diameter of the gasket 18 may be such that the lower edge of the sleeve seal 17 may seat thereon, it is preferred as shown in FIGS. 1-7 that the sleeve seal 17 seat directly on the washer 21, either on the floor of the cavity 19 or on the upper face of another embodiment of washer, to be explained in conjunction with FIG. 7.

The direct seating of the sleeve seal 17 on the washer 21 promotes symmetrical support of the bolt 13 while in sealing engagement with the tank, so that any tendency of the bolt 13 to cock or sway in position is minimized. A brass metal washer 21 is preferred but other metals and substantially inelastic materials may be utilized which have sufficient strength and are impervious and inert to gasoline and water, such as hardened synthetic rubber.

One or more nuts 22 are threaded on the bolt 13, the lowermost of the nuts essentially being a lock nut. Since the nut acts on the lower face of washer 21, the washer should have greater rigidity and strength than gasket 18.

In utilizing the device of the invention, the flared end 16 of bolt 13 is inserted through the hole 11 followed by the sleeve seal 17. Optionally, the sleeve seal 17 first may be fitted on the bolt 13 and this combination then inserted through the hole to the point where the lower end of the sleeve seal rests against the edges of the hole.

The hole generally is punched, cut or reamed to a predetermined size determined by the diameters of the bolt 13 and sleeve seal 17. Tools are known and available for this purpose, comprising either a cutting tool or a punch. If a punch is utilized an inwardly directed burr, skirt or jagged edge 12 will usually result as shown in FIGS. 4 and 5. However, it is possible by careful cutting to avoid such irregularities.

The gasket 18 is then placed over the exposed end 15 of the bolt, followed by the washer 21, such that the gasket seats snugly within the cavity 19 of the washer. The bolt end 15 is gripped to prevent the bolt from turning and the first nut 22 is advanced on the thread of the bolt while the second nut 22 may rest loosely on the end of the bolt. The second nut may then be tightened against the first nut to lock the device in place. Optionally, the entire combination of bolt, sleeve, gasket, washer and nuts may be formed as shown in FIG. 2 and this combination inserted through the hole 11, followed by tightening of the nuts 22.

It will be noted (FIG. 2) that the upper end of the sleeve seal 17 is maintained just below the flared portion 16, so that, when inserting the device in a hole, the combination of bolt and sleeve may pass through the hole 11. However, upon advancement of the upper nut 22 against the lower face of the washer 21, the flared portion 16 of the bolt causes radial expansion of the sleeve seal 17, as best shown in FIG. 3. The expansion prevents the sleeve seal as well as the bolt 13 from pulling out of the hole 11. This expansion is also accompanied by downward thrust of the sleeve seal 17 against the bottom of cavity 19, together with a certain degree of radial expansion against the inside walls of the gasket 18 below the flared portion 16 and against the edges of the hole 11. The result, as shown in FIG. 3, is tight sealing of the hole.

The device is easily removed for redraining of the tank by loosening the nuts 22 while gripping the bolt end 15. Another embodiment of sleeve seal 23 is shown in FIGS. 4 and 5. Here the sleeve seal 23, while unitary in construction like the sleeve seal 17, has an intermediate wall portion 24 of reduced thickness above a lower wall portion 23a of thickness equal to that of the upper wall. The reduced thickness wall portion 24 is arranged such that it will extend a predetermined distance above the inner edges of the hole 11 when the lower edge of the sleeve seal is seated in the cavity 19 of washer 21.

Upon threading of nut 22 upwardly on bolt 13, not only will the flared end 16 of the bolt force the sleeve seal 23 downwardly and slightly radially outward, but also the reduced thickness wall portion 24 will bulge outwardly, as shown in FIG. 5. The outward bulge causes the sleeve seal to anchor more securely on the edges of the hole 11, especially when the edge of the hole 11 has irregularities 12 resulting from upturned edges or burrs which may occur when the hole 11 is punched into the tank 10. When such irregularities are on the edge of a hole it is also possible that the diameter of the hole may not be uniform. The outwardly bulged portion 24 will fill in such irregularities and thereby assist in sealing and in seating the sleeve seal 23 squarely on the washer 21, thus assuring a more complete and stable seal.

Another embodiment of sleeve seal is shown in FIG. 6 together with a bolt 25 generally equivalent in construction and function to the bolt 13, including a flared upper end 26, but differing in having a lower, grippable end 27 which is formed with two parallel flats or walls rather than with a square end 15.

In the embodiment of sleeve seal shown in FIG. 6, it will be noted that the sleeve seal comprises two pieces, an upper component 28 having a wall 29 of reduced thickness formed on the lower end, and a separate sleeve seal component 31 equivalent to the sleeve seal portion 23a of FIGS. 4 and 5 but having a slightly chamfered or tapered upper edge 32. The chamfered upper edge 32 is arranged adjacent the reduced thickness wall portion 29 so that upon advancement of nut 22, the edge 32 wedges the reduced thickness wall portion 29 outwardly, in cooperation with the bulge induced in this portion by the downward and radially outward forces imposed by the flared end 26 on the upper sleeve seal portion 28.

This two-piece construction of the sleeve seal thereby enhances the outward bulge of the reduced wall portion, as described in FIGS. 4 and 5, and also promotes locking and sealing contact of the sleeve seal 28 on irregular or burred edges 12 of the hole 11.

For gasoline tanks of plate thickness in the range of about 0.008 to 0.014 inches, a useful sleeve seal length will be about 0.312 inches, this length including the height of the second, lower, sleeve seal component 31 if the sleeve seal is of the two-piece construction shown in FIG. 6. The lower component 31 of the two-piece sleeve seal may have a length of about 0.104 to 0.060 inch. Of course, the dimensions of the sleeve seal, whether unitary or two-piece, may be varied in accordance with other plate thicknesses. Similarly, the diameters of the sleeve seals and other components of the device of the invention may be varied in accordance with the diameter of the hole 11 cut or punched in a tank.

FIG. 7 shows another form of washer 33 which may be substituted for the washer 21 described above. The washer 33 differs from washer 21 in that it has an inner circumferential wall 34 defining between it and the outer wall 35 a cavity 36 for receiving the gasket 18. It will be evident that this form of washer causes sleeve seal 17 (or the two-piece sleeve seal 28, 31 of FIG. 6) to seat on the upper face of the washer 33 rather than in a cavity 19 as in FIGS. 1–6. This design of washer will permit use of a sleeve seal of somewhat shorter length but otherwise the washer and device will operate in substantially equivalent manner as described with reference to FIGS. 1–6.

A stop at the optimum threading of the nut 22 on the bolt may conveniently be provided by limiting the amount of thread on the bolt to that just required for optimum tightening and sealing. The amount of thread also will depend on the tank plate thickness but it will be evident the amount of thread can readily be correlated in this fashion and a stock of devices of the invention made available to take care of tank plates of different thicknesses.

While the invention has been illustrated and described in what are considered to be the most practical and preferred embodiments, it will be recognized that many variations are possible and come within the scope thereof, the appended claims therefore being entitled to a full range of equivalents.

What is claimed is:

1. A device for plugging gasoline tanks and the like, comprising:

a bolt having a flared end, a grippable end and a threaded portion between said ends;

a non-metallic, radially expandable sleeve seal slidably fitted on said bolt below said flared end and having an outside diameter adapting said sleeve seal to be received in a hole of predetermined diameter in said gasoline tank;

a gasket slidably fitted on said sleeve seal, the outside diameter of said gasket being greater than the diameter of said hole;

a washer on said bolt, said washer having a cavity for sealingly receiving said gasket; and at least one nut on said threaded portion in abutment with said washer on the opposite face thereof from said cavity;

said nut acting on said washer and bolt, when said washer and gasket abut the rim of said hole in said tank, whereby said flared end of said bolt causes said sleeve seal to expand outwardly of said hole and thereby to engage and to anchor on the edges of said hole interiorly of said tank, and said gasket sealingly engages the rim and edges of said hole exteriorly of said tank.

2. A device as in claim 1 wherein the wall of said sleeve seal has a portion of reduced thickness, said reduced thickness wall portion being adapted to bulge outwardly interiorly of said tank when said nut acts on said washer and bolt.

3. A device as in claim 2 wherein said reduced thickness wall portion is intermediate the ends of said sleeve seal.

4. A device as in claim 2 wherein said sleeve seal comprises a first sleeve seal and said reduced thickness wall portion is formed on the end of said first sleeve seal proximate to said washer, said device further including a second sleeve seal of a non-metallic, radially expandable material, said second sleeve seal being slidably fitted on said bolt below said first sleeve seal and having an outside diameter adapting it to be received in said hole of predetermined diameter, said gasket slidably fitting on said second sleeve seal, said second sleeve seal having a chamfered edge and being arranged adjacent said reduced wall thickness portion of said first sleeve seal, such that said chamfered edge cooperates with the action of said nut on said bolt to cause said bulge of said reduced wall thickness portion.

5. A device as in claim 1 wherein said sleeve seal abuts the floor of said cavity.

6. A device as in claim 1 wherein said sleeve seal abuts the face of said washer adjacent said cavity.

* * * * *